UNITED STATES PATENT OFFICE.

CARL R. KRUEGER, OF SCHENECTADY, NEW YORK, ASSIGNOR TO GENERAL ELECTRIC COMPANY, A CORPORATION OF NEW YORK.

ELECTRODE.

1,156,696.

Specification of Letters Patent.

Patented Oct. 12, 1915.

No Drawing. Continuation in part of application Serial No. 700,819, filed May 31, 1912. This application filed June 28, 1913. Serial No. 776,241.

*To all whom it may concern:*

Be it known that I, CARL R. KRUEGER, a citizen of the United States, residing at Schenectady, in the county of Schenectady, State of New York, have invented certain new and useful Improvements in Electrodes, of which the following is a specification.

This is a continuation, in part, of my application, Serial Number 700,819, filed May 31, 1912.

My invention has reference to arc light electrodes of the kind known as luminous arc electrodes and flame arc electrodes in which the luminosity of the arc is mainly due to the presence in the electrode of titanium or cerium or any of their compounds. Electrodes of this character produce an arc which is more or less unsteady and it is necessary to incorporate in such electrodes certain materials which fuse and evaporate at a lower temperature than the light-giving material and which act to steady the arc and are therefore spoken of as "steadying materials." Of these the alkali salts are very effective, and sodium and potassium compounds have heretofore been used for this purpose, and when a yellow light is desired these materials, which impart a yellow color to the arc, are satisfactory. When, however, a white light is desired, as in the case of titaniferous electrodes, or electrodes containing cerium, these salts become objectionable.

I have found that lithium compounds have the same steadying effect on the white arc produced by electrodes containing titanium or cerium as do sodium and potassium salts, but with this difference: that lithium compounds do not color the arc flame perceptibly in any way and particularly do not impart a yellowish color to the same as do sodium and potassium compounds. Lithium gives a dark red spectrum line, but the intensity of the light of that line is so low, being at the far end of the red part of the spectrum, that it is completely hidden by the intense white arc spectra, particularly by the spectrum of titanium. I have further discovered that the use of lithium compounds as a steadying material in electrodes containing titanium as the light-giving material, has the additional and unexpected effect of increasing the light intensity of the arc; and I have found that this intensifying action of lithium is absent in electrodes which do not contain titanium or a titanium compound as one of the light-giving materials, or as the principal light-giving material, and that it is particularly absent when the light-giving material is calcium or any of its compounds. I have further found that the intensifying action of lithium in a titaniferous electrode is not materially diminished by the presence in such electrode of other steadying materials such as sodium, potassium or barium compounds.

My invention, therefore, comprises the use of a lithium compound, such as lithium fluorid, lithium borate, or lithium oxid as a steadying material in white arc light electrodes, and as a steadying and intensifying material in titaniferous arc light electrode, whether or not other steadying materials are also present in such electrode.

Of the arc electrodes to which my invention is applicable, those in which titanium carbid is the principal ingredient and those in which titanium oxid is used either alone or as an admixture to magnetite, are particularly useful. I have made a satisfactory electrode by mixing 96% of very finely powdered titanium carbid, such as is obtained on the market, with 3% of black oxid of copper and 1% of lithium fluorid, and filling the mixture into a thin iron tube.

The composition of the titanium carbid which is suitable for use in conjunction with my invention may vary widely. For example, I have used titanium carbid, made in the arc furnace, containing only a small percentage, say 6 or 7% of carbon, and I have also used titanium carbid which was made in the resistance furnace and which contained a large percentage of carbon, say 25 or 30%. Since the theoretical amount of carbon present in titanium carbid is approximately 20%, it will be seen that the first-mentioned material contains a large percentage of free metallic titanium in addition to the titanium carbid, while in the second one a substantial percentage of free carbon is mixed with the titanium carbid. It will be understood, therefore, that when I refer to titanium carbid, I mean such titanium carbid as is ordinarily obtained and in which free titanium or free carbon may be present, rather than to chemically pure titanium carbid, which it is practically impossible to obtain.

The use of cupreous material, such as black oxid of copper, is advantageous in connection with titaniferous materials, since by its use there is formed a conducting film on the arcing face of the electrode, and the formation of a layer of slag which has a tendency to form on electrodes containing titaniferous material is largely avoided. The use of cupreous material, however, is described and claimed in my application, Serial Number 654,878, filed October 16, 1911.

In the titanium carbid electrode the lithium compound serves the double purpose of a steadier which does not color the arc and as an intensifier, as hereinbefore indicated; the amount of lithium compound (1%) is, in this case, very small.

Another luminous arc electrode and to which my invention is eminently applicable, is the so-called magnetite electrode, usually composed of magnetite 62 parts, rutile 30 parts, chromite 8 parts, and sodium fluorid, about ¼% of the total mixture. This mixture, as well as others, containing magnetite, is known in the art as a "magnetite mixture." In accordance with my invention I add to the magnetite mixture a small percentage from ¼% to 1% of lithium compound, either as a substitute for the sodium fluorid or in addition thereto. In either case the presence of the lithium compound remarkably increases the intensity of the light emitted by the arc.

In the magnetite electrode the use of a chromium compound, such as chromite, has heretofore been deemed to be important, since it operates, in addition to its function as a restrainer, whereby it lengthens the life of the electrode, also as a steadier; but I have found that when, in accordance with my invention, lithium fluorid is used either in place of or in addition to sodium fluorid, the admixture of chromite becomes unnecessary. The magnetite mixture is preferably densely compacted, as by swaging, in the iron tube in which it is usually filled. The intensifying effect of the lithium, when the chromite is omitted, becomes very remarkable, the candle power of the arc increasing 80% and more over that yielded by the ordinary magnetite mixture with the same expenditure of electrical energy. With the chromite omitted, the magnetite mixture which gave the increased candle power above indicated was composed of magnetite 70 parts, rutile 30 parts, and lithium fluorid, 1% of the total mixture. I have found that in any magnetite mixture, the increase of lithium fluorid beyond 1% does not perceptibly further increase the candle power.

As another example of an electrode embodying my invention, I may mention one of the following composition:

Cerium titanium fluorid _____ 40%,
Lithium fluorid _____ 5%,
Carbon _____ 55%.

These materials are finely divided and mixed with a suitable binder and molded and baked as is the usual practice. In this electrode the carbon furnishes mainly the conducting vapors for the arc and such electrodes are more properly called flame electrodes, as distinguished from luminous arc electrodes, in which the light-giving vapors are the principal medium by which the current is carried from one electrode to the other, as is the case with the titanium carbid electrode, particularly when the titanium carbid is made in the arc furnace and contains only a small percentage of carbon.

While in the foregoing I have particularly mentioned lithium fluorid, the other lithium compounds mentioned, namely, lithium borate and lithium oxid, may advantageously be employed; the term "lithium fluorid" is, therefore, here used as typical of lithium compounds generally.

What I claim as new and desire to secure by Letters Patent of the United States, is:—

1. An arc light electrode containing a material or materials yielding a substantially white flaming or luminous arc and a steadier consisting principally of a lithium compound.

2. An arc light electrode containing titaniferous material, and a small percentage of lithium compound.

3. An arc light electrode, containing titanium as the preponderating light-giving material, and a small percentage of lithium compound.

4. An arc light electrode containing titanium carbid and a small percentage of lithium compound.

5. An arc light electrode composed of a magnetite mixture, and a small percentage of lithium compound.

In witness whereof, I have hereunto set my hand this 26th day of June 1913.

CARL R. KRUEGER.

Witnesses:
HELEN ORFORD,
MARGARET A. DELEHANTY.